United States Patent
Fey et al.

(10) Patent No.: US 6,873,642 B1
(45) Date of Patent: Mar. 29, 2005

(54) METHOD AND DEVICE FOR PROCESSING A RECEIVED SIGNAL TRANSMITTING CODED DATA

(75) Inventors: Wolfgang Fey, Niedernhausen (DE); Ling Chen, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 09/830,516

(22) PCT Filed: Oct. 13, 1999

(86) PCT No.: PCT/EP99/07684
§ 371 (c)(1),
(2), (4) Date: Jul. 25, 2001

(87) PCT Pub. No.: WO00/25490
PCT Pub. Date: May 4, 2000

(30) Foreign Application Priority Data

Oct. 27, 1998 (DE) ......................... 198 49 408

(51) Int. Cl.⁷ ................................. H03D 1/00
(52) U.S. Cl. ........................... 373/342; 375/238
(58) Field of Search ................. 375/342, 242, 375/241, 239, 360, 363, 238; 324/174, 207.2, 207.22; 701/45, 29, 44

(56) References Cited

U.S. PATENT DOCUMENTS

| | | | |
|---|---|---|---|
| 5,012,467 A | 4/1991 | Crane | |
| 5,315,299 A | 5/1994 | Matsumoto | |
| 5,459,751 A | 10/1995 | Okamoto | |
| 5,621,758 A | 4/1997 | Suzuki et al. | |
| 5,633,898 A | * 5/1997 | Kishigami et al. | .......... 375/344 |
| 5,790,603 A | 8/1998 | Maeda et al. | |
| 6,148,025 A | * 11/2000 | Shirani et al. | .............. 375/238 |

FOREIGN PATENT DOCUMENTS

| | | |
|---|---|---|
| DE | 196 05 643 | 2/1997 |
| DE | 196 43 410 | 6/1998 |
| DE | 196 50 935 | 6/1998 |
| DE | 198 08 575 | 5/1999 |
| FR | 2 725 091 | 3/1996 |

OTHER PUBLICATIONS

Search Report of the German Patent Office for Application No. 198 36 693.0.

* cited by examiner

Primary Examiner—Khai Tran
(74) Attorney, Agent, or Firm—Honigman, Miller, Schwartz and Cohn LLP (57) ABSTRACT

The present invention relates to a method for conditioning a received signal that transmits coded data, wherein the coding of the data includes a defined coding clock pulse and the signal includes edges produced in accordance with the coding clock pulse, wherein from the received signal a time constant ($t_m$) set in accordance with the coding clock pulse is determined, a first signal part which has a first edge is conditioned at a first time that is set in accordance with the time constant ($t_m$) or in a first time window that is set in accordance with the time constant ($t_m$), and a second signal part which has a second edge is conditioned at a second time that is set in accordance with the time constant ($t_m$) and in dependence on the time of the first edge or in a second time window that is set in accordance with the time constant ($t_m$) and in dependence on the time of the first edge.

28 Claims, 10 Drawing Sheets

METHOD AND DEVICE FOR PROCESSING A RECEIVED SIGNAL TRANSMITTING CODED DATA

TECHNICAL FIELD

The present invention generally relates to signal encoding methodologies and more particularly relates to a method and a device for conditioning a received signal that carries with it coded data.

BACKGROUND OF THE INVENTION

Where the objective is to condition and decode a received signal which contains coded data, defined conditions must be known at the receiving end, on the basis of which coding was effected (included) at the transmitting end so that decoding is quickly and reliably possible. For example, the coding method must be known to the receiving end (e.g. edge-coded, binary, PWM, AM, FM). Because coded data are usually transmitted time-serially, certain coding methods, such as edge-coded, binary signals or in PWM (pulse width modulation), necessitate that the time base be known on the basis of which coding is carried out to permit correct decoding at the receiving end.

Figure 1:
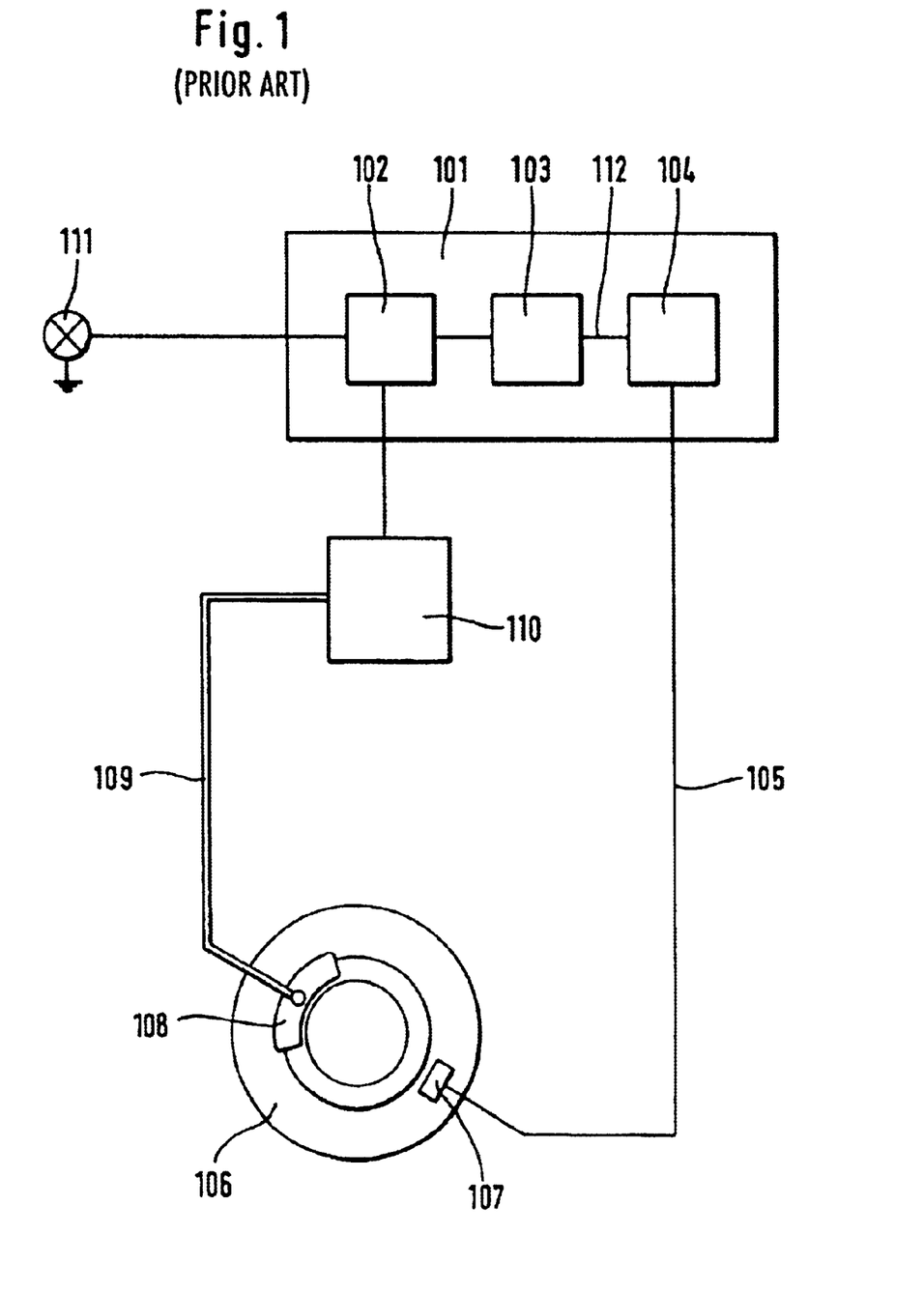
FIG. 1 is an example of implementation of the present invention in the manufacture of vehicles.

Publication DE 196 50 935 A1, for example, discloses the configuration of a signal that carries data originating at the transmitting end. This configuration is employed in vehicle manufacture, and it especially concerns the transfer of data from an active wheel sensor to a primary control unit. A system of this type is represented in FIG. 1. A sensor 107, on the one hand, and a brake 108, on the other hand, are fitted to a wheel 106. Sensor 107 is an 'active' sensor which means that it not only modifies incoming electric signals (voltage or current), but also actively shapes signals to convey information from the wheel 106 to a superior unit 101. Sensor 107 is connected to unit 101 by way of line 105, and line 105 may comprise a plurality of lines. Sensor 107 transmits various pieces of information related to wheel 106. At first information relating to the wheel rotational speed should be transmitted. In addition, other pieces of information can be transmitted such as temperature, wear of brake shoes, or similar factors. Because sensor 107 is placed in a comparatively 'rough' environment, i.e., directly on the wheel (exposed to vibrations, temperature differences, moisture), and because another requirement is to minimize the effort and structure in wiring for making the sensor less susceptible to malfunction, it is necessary to arrange the data transfer method so that it reliably functions despite the adverse conditions described hereinabove.

The system in FIG. 1 includes in the control or regulation unit 101 a device 104 according to the present invention for conditioning a signal that transfers coded data; subsequent thereto is a decoding unit 103 which is connected to the device 104 by way of a line 112 that may comprise a plurality of individual lines, and thereafter a control system 102 which, in accordance with the signals received (also additional, not shown input signals) produces actuating data for the wheel concerned, on the one hand, and other data, such as alarms for alarm units 111, etc., on the other hand. The control system 102 can output e.g. electric actuating signals to a valve block 10 which, in turn, influences the wheel brake 108 by way of a hydraulic line 109.

The signal produced in the active sensor 107 and transferred to the device 104 of the present invention by way of line 105 can be configured as described in DE 196 50 935. The signal may look like shown in FIG. 2. The signal produced by sensor 107 includes different pulses, i.e., a wheel pulse 201 followed by data pulses 203 with pulse pauses 202, 204 of different significance in between them. The first pulse pause 202 can be adjusted at the transmitting end and serves for a time delay before the transfer of coded data after the wheel pulse 201. The pulse pauses 204 are data pulse pauses which, exactly as the data pulses 203, indicate amplitude-coded binary data which were coded with a time clock $t_p$ that corresponds to the ideal width of the wheel pulse 201. The data pulses 203 and data pulse pauses 204 also have the ideal width $t_p$. The pulse pause 202 has a width of $t_p/2$ to permit sampling of the data pulses 203 and data pulse pauses 204 in the interval of $t_p$ after the end of a wheel pulse 201. The time ratios between wheel pulse, data pulse, and pulse pause must be known at the receiving end so that the data can be conditioned and decoded correctly. The time base $t_p$ is either known at the receiving end or can preferably be obtained in the conditioning operation by time measurement, e.g. measuring the pulse width.

Figure 2:
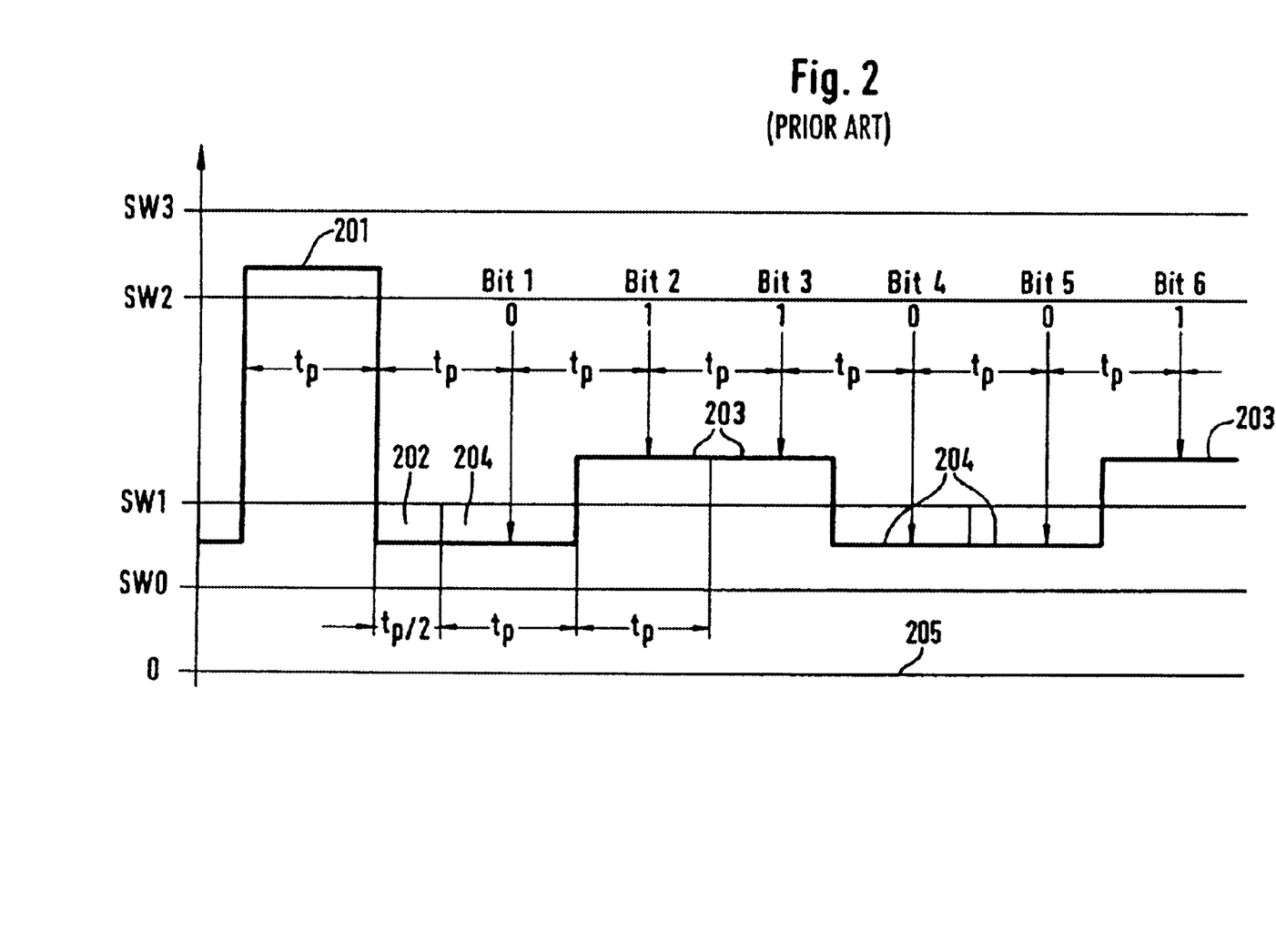
FIG. 2 shows an ideal signal variation as known from prior art.

Preferably, the wheel pulse 201 has a higher amplitude than the data pulses 203. In FIG. 2, the wheel pulse 201 has an amplitude which is higher than a second threshold value SW2 and lower than a third threshold value SW3; the data pulses 203 have an amplitude which is higher than a first threshold value SW1 but lower than SW2, and the pulse pauses 202, 204 have an amplitude which is higher than a bottom threshold value SW0 but lower than SW1. The bottom threshold value SW0 lies above a zero line 205. A limited number of data pulses follows a wheel pulse. The coded data exemplarily show a bit sequence of 011001, that means, a data pulse 203 shows a logical '1' and a data pulse pause 204 shows a logical '0'. The sequence made up of a wheel pulse 201 and data pulses 203 or data pulse pauses 204 is output periodically, and the duration of the period at the transmitting end is determined in accordance with the wheel rotational speed so that following the data pulses 203 is again a wheel pulse 201 with new data pulses 203 and/or data pulse pauses 202, 204. The wheel rotational speed can then be determined from the distance between consecutive wheel pulses 201. In between consecutive wheel pulses 201, and in dependence on the interval between the wheel pulses 201, an appropriate number of data pulses 203 or data pulse pauses 204 is transmitted which permit transfer of further information such as brake lining wear, brake temperature, brake fluid temperature, or brake fluid condition, etc., from the wheel via the line 105 to the device 104 of the present invention. The shorter the interval between the consecutive wheel pulses 201 is, the fewer data pulses 203 or data pulse pauses 204 can be transmitted.

In the applicant's former application DE 198 08 575.3 entitled 'Method and device for conditioning a received signal that transmits coded data', a method and a device for conditioning data coded in the way described hereinabove is disclosed. In this application, the width $t_m$ of a received wheel pulse, which corresponds to $t_p$ in the optimal case, is determined as a time base, and the data pulses are subsequently sampled in regular intervals $t_m$. However, as the edges of the transmitted pulses are not infinitely steep, which would be ideal, but have a finite rise (and the said rise can be different from pulse to pulse, especially from wheel pulse to wheel pulse due to environmental influences), an error in the determination of the time base may occur so that this base no longer corresponds to the width of the data pulses. This is a shortcoming in the above-mentioned former application because this error may cumulate in data conditioning so that the maximum number of data which can be conditioned reliably between two wheel pulses is limited.

The above problem was described with respect to an application in vehicle manufacture. It may occur, however, also in other applications.

An object of the present invention is to provide a method and a device for conditioning a signal that transmits coded data which permit a reliable decoding of the transmitted data and do not limit the number of data to be transmitted.

Before embodiments of the present invention will be described in detail, a coding method according to the present invention is explained with reference to FIG. 3.

An ideal signal originating from sensor 107 can have a corresponding shape. The binary data are not amplitude-coded, but edge-coded therein. The signal includes a wheel pulse 301 and data pulses 305 with data edges 303, the width of the wheel pulse 301 in turn being $t_p$ and the data being coded with the time clock $t_p$, i.e., the data edges 303 have ideally a distance of $t_p$ one to the other. Preferably the same facts as in FIG. 2 apply to the amplitudes of the pulses. Exactly as in FIG. 2, the coded data show the exemplary sequence of bits of 011001, and herein a leading data edge shows a logical '1', and a trailing data edge shows a logical '0'. Of course, the edges can also show the reverse bit values or still other values. It can be seen in FIG. 3 that an intermediate edge 304 is necessary when e.g. consecutive bits with the same logical value shall be transmitted because e.g. two consecutive coded trailing edges can only be transmitted when a leading edge lies in between. The intermediate edges 304 do not carry data information and, therefore, must not be conditioned at the receiving end.

The sequence of a wheel pulse 301 and data pulses 305 is periodical as the signal sequence in FIG. 2. The wheel rotational speed may then be determined from the distance between consecutive wheel pulses 301. An appropriate number of data pulses 305 with the above-mentioned information is transmitted between consecutive wheel pulses 301 in dependence on the interval between the wheel pulses 301.

In this case, too, it is necessary that time ratios between wheel pulse, data pulse and pulse pause be known at the receiving end. When the transmitter is employed in a rough environment (as described above) so that the signal edges, especially the wheel pulse edges, are differently steep due to varying environmental influences, the time clock on the basis of which coding is carried out can be determined only with insufficient accuracy at the receiving end. This is a problem. Further, the time clock itself may be exposed to variations due to the rough environment. A fixed time base cannot be assumed then. The time clock will rather vary so that it must be advised to the receiver from case to case.

According to the present invention, along with the transmitted signal an information about the time clock, also referred to as coding clock pulse, is transmitted on the basis of which coding was effected. 'Coding clock pulse' refers to the clock at which the data bits appear in succession. This need not be the working clock of a coding circuit, nor the working clock of a circuit for the conditioning of data, but can be chosen in accordance with such a circuit clock. This information relating to the coding clock pulse is determined as a time constant at the receiving end. Further conditioning of the received signal is performed in accordance with the said time constant.

In accordance with the time constant, a time or a time window is set for which or in which a first signal part which has a first edge is conditioned. Further, a second time or a second time window is set in accordance with the time constant and in dependence on the time of the first edge, for which or in which a second signal part is conditioned. A time window is a time range where the detection of edges or, in general, signal conditioning is permitted. Another time window is respectively set based on a signal edge detected in a previous time window, and the time of the commencement and the width of the time window depends on the time constant. When another edge is detected in this time window, this edge can be taken as a new basis for another time window. One advantage involves that an edge which appears sooner or later than expected can be detected because edge detection is possible within a time range which bounds the time an edge is expected. Another advantage is that the error in determining the time constant is not cumulative due to the fact that a new edge detection range is determined based on the actual time of an edge. This advantage also gives rise to the additional benefit of allowing an unlimited number of data which can be conditioned with certainty between two wheel pulses is not limited.

Preferably, the transmission of the information relating to the coding clock pulse is carried out at the beginning of data transfer. The time constant also can then be established at the commencement of the conditioning operation so that the respectively latest information can be used for conditioning of the following data. In 'frequently' recurrent sequences of signals, however, a time constant obtained in an earlier cycle may also be used for a following cycle. The time constant obtained can correspond to a bit duration or, e.g., in edge-coded data to the time interval between two data edges in the received signal, or at least permit inferring therefrom that binary coding was effected, for example, by way of a proportional correlation. The time constant obtained can designate an average pulse duration or similar items in pulse width modulation.

Figure 4:
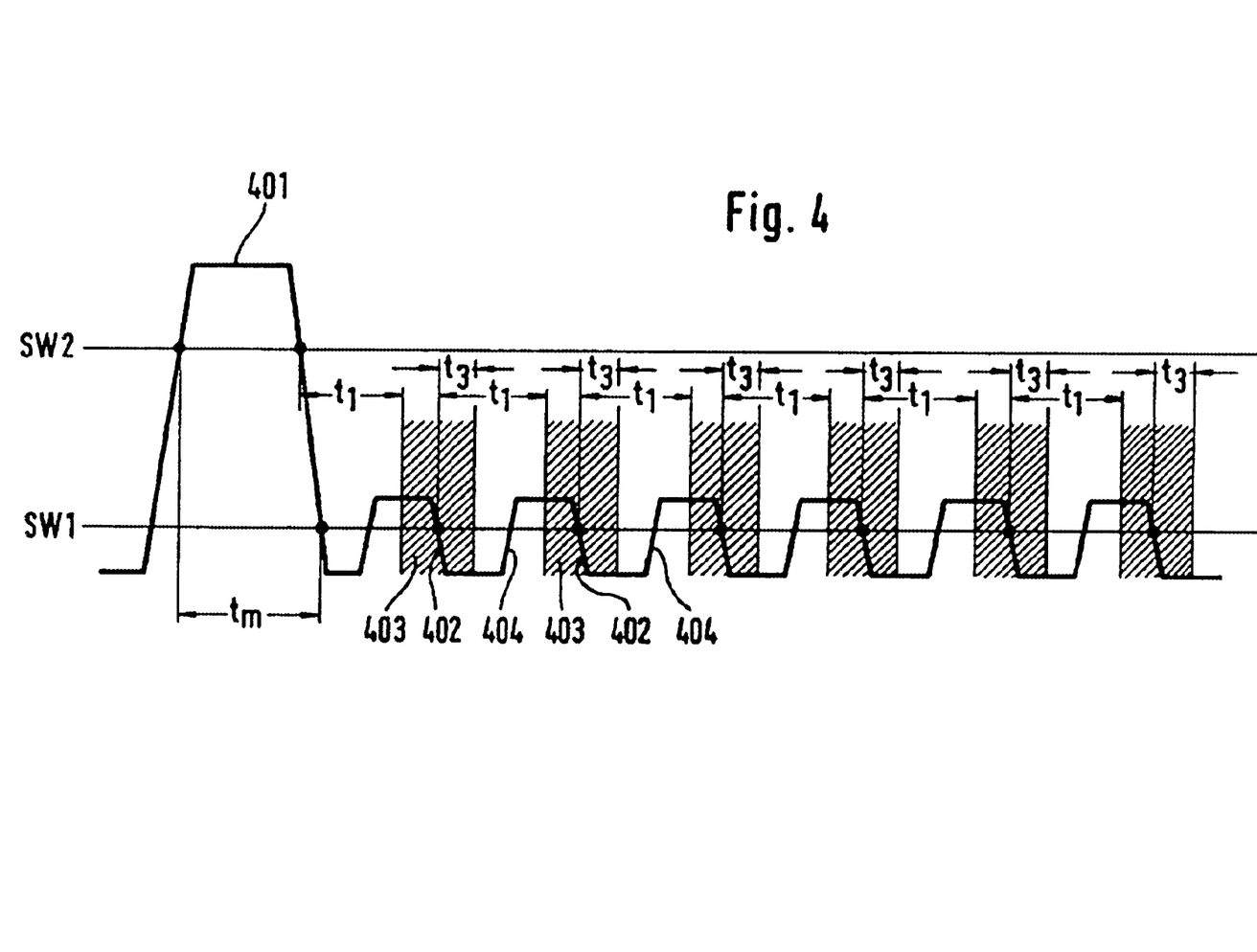
FIG. 4 is a view of a real signal variation according to the present invention with a schematic representation of an embodiment of the method of the present invention.

FIG. 4 illustrates one embodiment of the method according to the present invention for conditioning a received signal that transmits coded data. The signal includes pulses with real, finite steep edges. The width or duration of the wheel pulse 401 is designated as time constant tm. In this arrangement, the width is determined as time period between the time the second threshold value SW2 is exceeded and the time when the value drops below the first threshold value SW1. However, the time constant $t_m$ may also be fixed differently, for example, as a time period between exceeding and dropping below the first threshold value SW1 or the second threshold value SW2, or in another fashion.

The grey ranges are time windows 403 which encompass the data edges 402 being conditioned. The bright ranges in between contain intermediate edges 404 which must not be taken into account in data conditioning because they do not carry data information. Only an edge which lies within a time window 403 may and can be detected as a data edge 402. The time window 403 must be chosen accordingly to this end.

In accordance with the time constant $t_m$, two durations $t_1$ and $t_3$ are determined, the first duration $t_1$ determining the opening of a time window 403 and the third duration $t_3$ determining the closing of a time window 403. An opened time window 403 will be closed after the third duration $t_3$, starting from an edge 402 detected in this time window 403. A next time window 403 will be opened after a first duration $t_1$ starting from the edge 402 detected in the previous time window 403. In this arrangement, 'opening' of a time window 403 means the beginning and 'closing' of a time window 403 means the end of a time where edge detection is allowed.

Thus, the time of detection of a data edge 402 in a time window 403 determines the time for closing of the instantaneous time window 403 and opening of the next time window 403 in which another data edge 402 is expected. It is favorable, but not imperative, that closing of the one time window and opening of the following time window 403 is based upon the same edge or on the last edge detected. It is assumed that the data edges ideally have the same distance from one another because coding was effected with a fixed coding clock pulse. Accordingly, the durations $t_1$ and $t_3$ and, thus, the time windows 403 were set. The first duration $t_1$ must be so determined that the time window 403 will only be opened after a possible intermediate edge 404 has appeared. Further, a time window 403 must be closed before an intermediate edge 404 appears. If a data edge 402 in a time window 403 arrives too early or too late, this will not have negative effects on the detection of the following data edges 402 because the time windows 403 are set adaptively in dependence on respectively one previous data edge 402, preferably the last one detected, and are thus not determined invariably according to a fixed time pattern. Therefore, a wrong determination of the time constant $t_m$ will not either have great effects because this error has equal effects for each time window and will not cumulate. The fact that conditioning does not take place at defined times but at any time within a longer period of time (time window), there is the possibility of detecting also data edges which appear too early or too late, and the time window may only be chosen to be so wide that the intermediate edges 404 are not detected.

When data are not edge-coded but e.g. amplitude-coded and shall be conditioned at defined times, a point of time in accordance with the time constant $t_m$ can be determined for data conditioning instead of the time window, and the said time is set in dependence on the time of a signal edge.

DETAILED DESCRIPTION OF THE PREFERRED EMBODIMENTS

Figure 3:
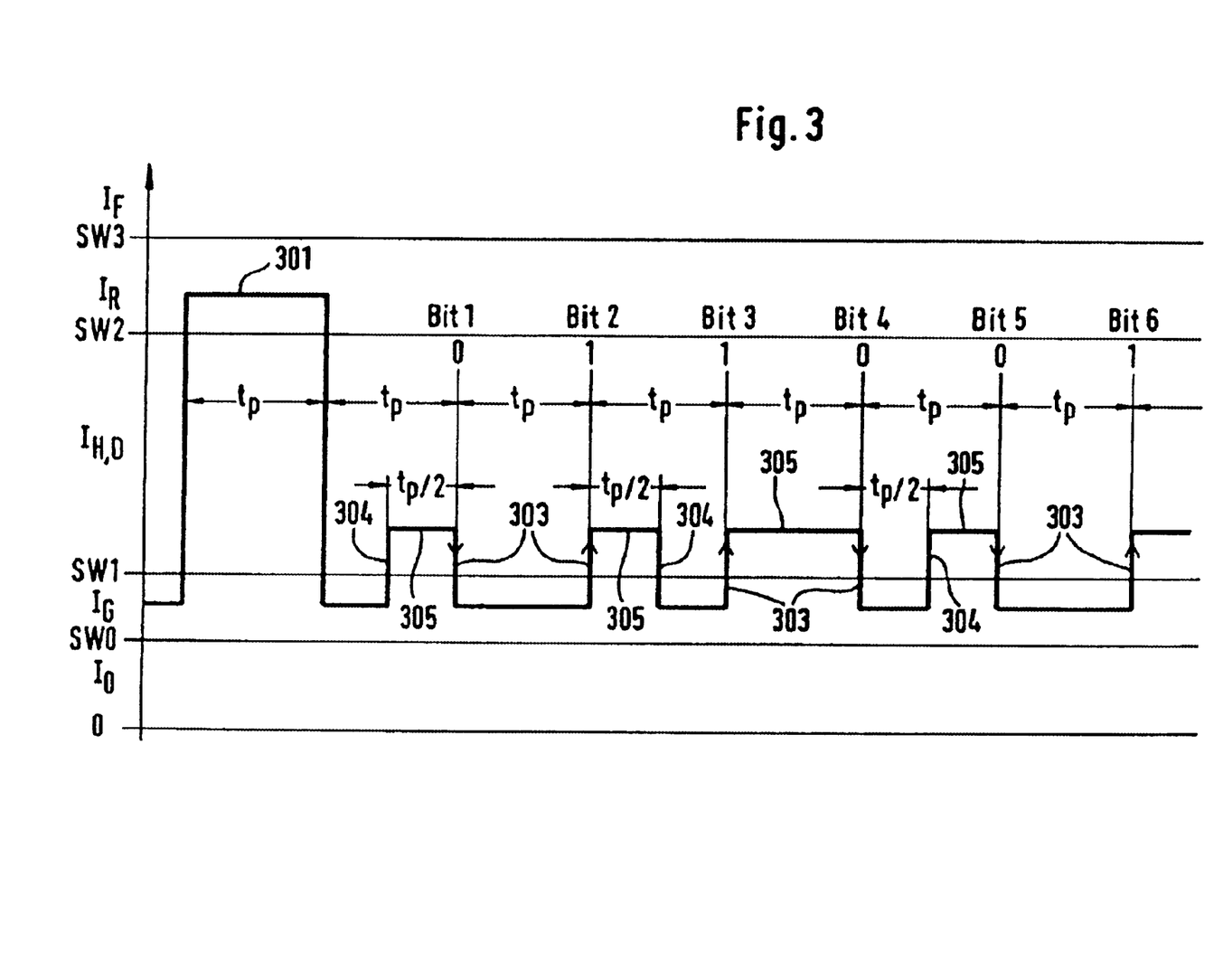
FIG. 3 shows an ideal signal variation according to the present invention.

FIG. 3 shows an ideal signal variation for edge-coded data, and the method wherein data are transmitted in an edge-coded fashion is likewise considered as the invention. The signal includes pulses, the first pulse of which is preferably a wheel pulse 301 and the further pulses are data pulses 305 with coded data edges 303 and intermediate edges 304. The data edges 303 have a distance $t_p$ from each other, and the distance between a data edge 303 and an intermediate edge 304 preferably amounts to $t_p/2$. The first data edge 303 appears after the time $t_p$ after the trailing edge of the wheel pulse 301. Because this data edge 303 also is a trailing edge in this case, an intermediate edge 304 is transmitted between the two trailing edges.

The signal of the present invention is preferably composed of distinguishable pulses, and the pulses are preferably current pulses, but may also be voltage pulses. The amplitude of the wheel pulse is preferably higher than the second threshold value SW2 and lower than a third threshold value SW3. This permits distinguishing the wheel pulse from the other pulses, the amplitude of which is preferably higher than the first threshold value SW1 but lower than the second threshold value SW2. When a pulse amplitude is higher than the third threshold value SW3, it can be detected as an error. Likewise, when an amplitude which is lower than the bottom threshold value SW0 it can also be detected as an error condition. Thus, five amplitude ranges can be distinguished in this embodiment: a faulty range $I_0$ below SW0, a range $I_G$ between SW0 and SW1, in which the signal minimum is on a level which represents the energy supply of the active sensor 107, a range $I_{H,D}$ between SW1 and SW2 in which the amplitudes of the data pulses 305 lie or those of an auxiliary pulse which will be described in detail hereinbelow, a range $I_R$ between SW2 and SW3 for the amplitude of a wheel pulse 301 and a top faulty range $I_F$ above SW3.

Figure 5:
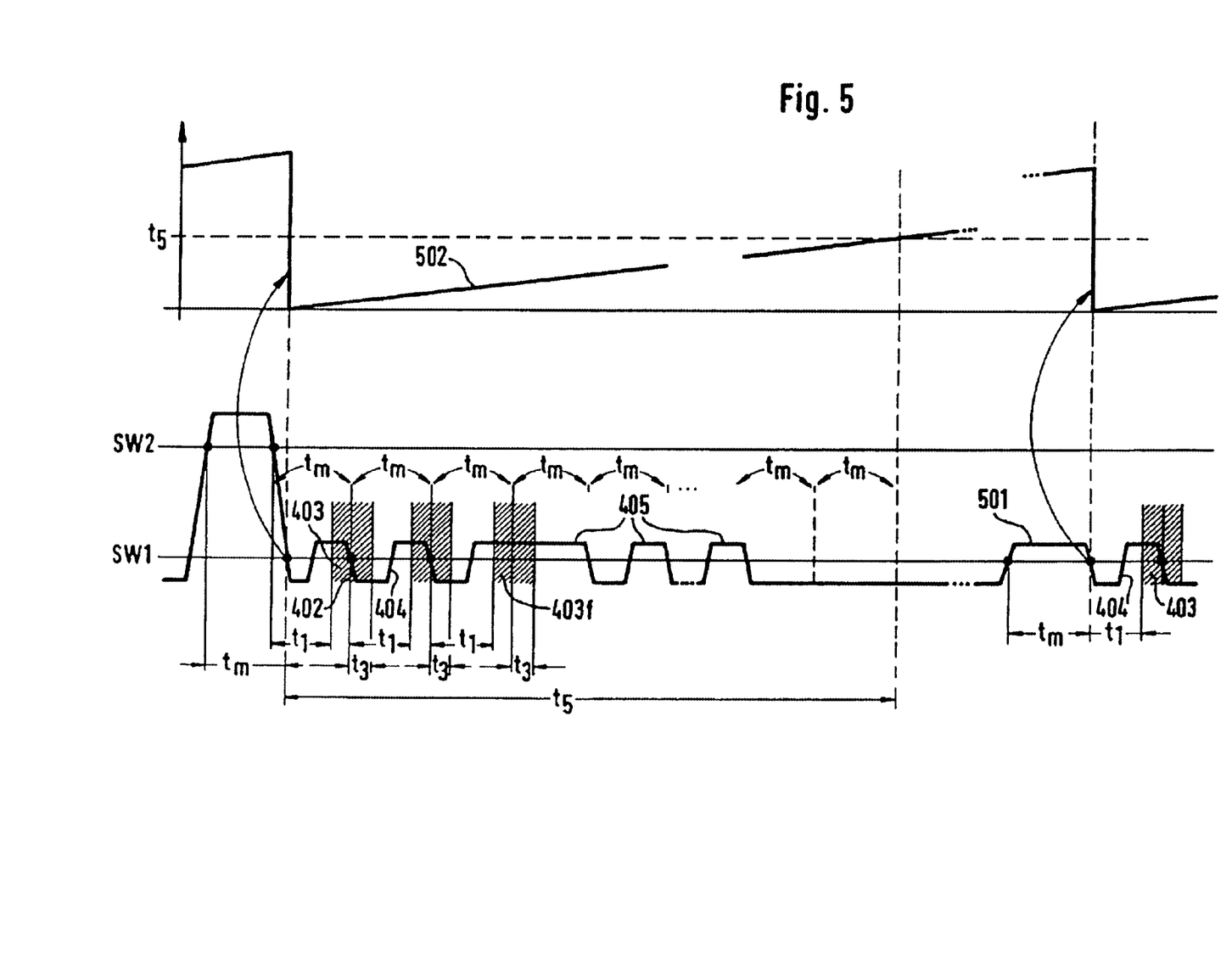
FIG. 5 is a view of a real signal variation according to the present invention with a schematic representation of another embodiment of the method of the present invention.

When the wheel moves very slowly or stands still, the wheel pulse 401 is replaced by an auxiliary pulse 501 as shown in FIG. 5. Because an auxiliary pulse 501 preferably has almost the same amplitude as a data pulse 405, it must distinguish from the said in a different way. The maximum number $A_B$ of data bits to be transmitted between two wheel pulses, for example, is known at the transmitting end and the receiving end. Preferably, $A_B=9$. At the receiving end, a fifth duration $t_5$ may then be determined in accordance with the time constant $t_m$ within which the maximum number $A_B$ of data bits are transmitted, starting from the end of a previous, preferably the last wheel pulse or auxiliary pulse. The end of a wheel pulse or auxiliary pulse can be the point where a value drops below the first threshold value SW1. Duration $t_5$ is then waited for until a pulse which has an amplitude in the range $I_{H,D}$ will be detected at the earliest as an auxiliary pulse 501 rather than as a data pulse 305, provided no wheel pulse 401 has meanwhile appeared. The duration $t_5$ can be an integral multiple n of the time constant $t_m$, and $n>A_B+1$, preferably $n=A_B+2$. The auxiliary pulse, too, has preferably the same width $t_m$ as the wheel pulse 401 and can, thus, carry the information about the coding clock pulse.

Figure 6:
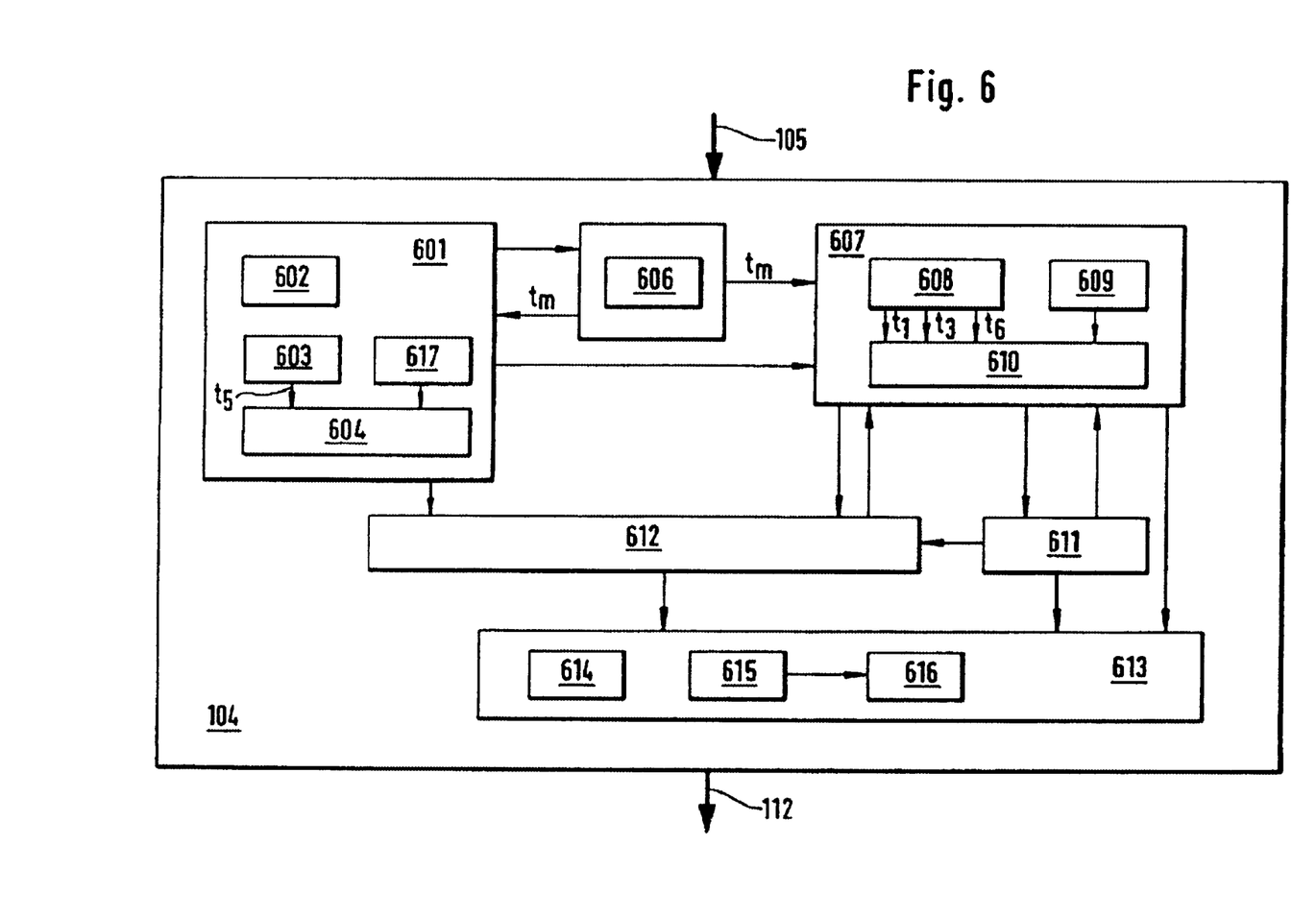
FIG. 6 is a block diagram of an embodiment of a device according to the present invention.

An embodiment of the device 104 of the present invention is shown in FIG. 6. Device 104 receives the signal pulses from the sensor 107 by way of line 105. The signal pulses can be sent to several units within the device 104. They are evaluated by a pulse detection unit 601. To this end, the pulse detection unit 601 includes a threshold value comparison unit 602 which compares the signal pulses with the threshold values SW0, SW1, SW2, and SW3 illustrated in FIG. 3, for example. Depending on the result of the comparison, the pulse detection unit 601 decides whether there is a wheel pulse 401, a data pulse 405 or auxiliary pulse 501, or an error.

When the pulse detection unit 601 has detected a wheel pulse 401 or auxiliary pulse 501, a first counter 606 of a first determining unit 605 is reset and started. The first counter 606 is stopped when the wheel pulse 401 or auxiliary pulse 501 has halted below the first threshold value SW1. The first determining device 605 determines from this the time constant $t_m$ which it submits to a time window setting unit 607 and to the pulse detection unit 601.

The time window setting unit 607 includes a second determining unit 608 which determines the first $t_1$, third $t_3$, and a sixth duration $t_6$ that determine opening and closing of a time window 403, and relays corresponding values, which have been designated by $t_1$, $t_3$, and $t_6$ for the sake of clarity, to a first duration comparison unit 610. The count of a second counter 609 is compared with the values $t_1$, $t_3$, and $t_6$ in the first duration comparison unit 610. The time window setting unit 607 opens or closes a time window 403 in dependence on the result of this comparison. Details will be described hereinbelow with respect to FIG. 7. The output of the time window setting unit 607 is connected to an edge detection unit 611, an error detection unit 612, and a memory unit 613 to advise to the respective units at what time a time window 403 is open.

The pulse detection unit 601 includes a third determining unit 603 which determines a duration $t_5$ and relays a corresponding value, which will be referred to as $t_5$ in the following for the sake of clarity, to a second duration comparison unit 604. The count of a third counter 617 is compared with $t_5$ therein. When it counted until $t_5$, the third counter 617 can be stopped, or can continue counting. When the count of the third counter 617 is higher than, or equal to $t_5$, the pulse detection unit 601 recognizes a pulse in the range $I_{H,D}$ as an auxiliary pulse 501, otherwise as a data pulse 405. The time window setting unit 607 is provided with a message from the pulse detection unit 601 when the third counter 617 has counted until $t_5$ so that the time window setting unit 607 will not open a new time window 403.

The count 502 of the third counter 617 is plotted against an exemplary signal variation in FIG. 5.

The third counter 617 is reset and restarted when a wheel pulse 401 or auxiliary pulse 501 has dropped below the first threshold value SW1.

When the edge detection unit 611 has detected an edge in an opened window, it will relay the result to the memory unit 613 where the detected data bit is stored in a data memory 614. When an edge is detected in the time window, the edge detection unit 611 will submit a signal to the time window setting unit 607 and to the error detection unit 612. The error detection unit 612 is connected to the pulse detection unit 601 and learns e.g. from it whether a wheel pulse 401 exists. When the error detection unit 612 detects an error, it will inform the time window setting unit 607 so that the latter will not open a new time window 403. Depending on whether the error detection unit 612 detects an error in a time window, the validity setting unit 615 sets a validity bit in the validity memory 616, and e.g. a set '1'-bit can indicate a valid data bit and a set '0'-bit can indicate a faulty and, thus, invalid, data bit. By way of line 112, the data bits and validity bits can be read out and sent to a decoding unit 103 according to FIG. 1.

Figure 7:
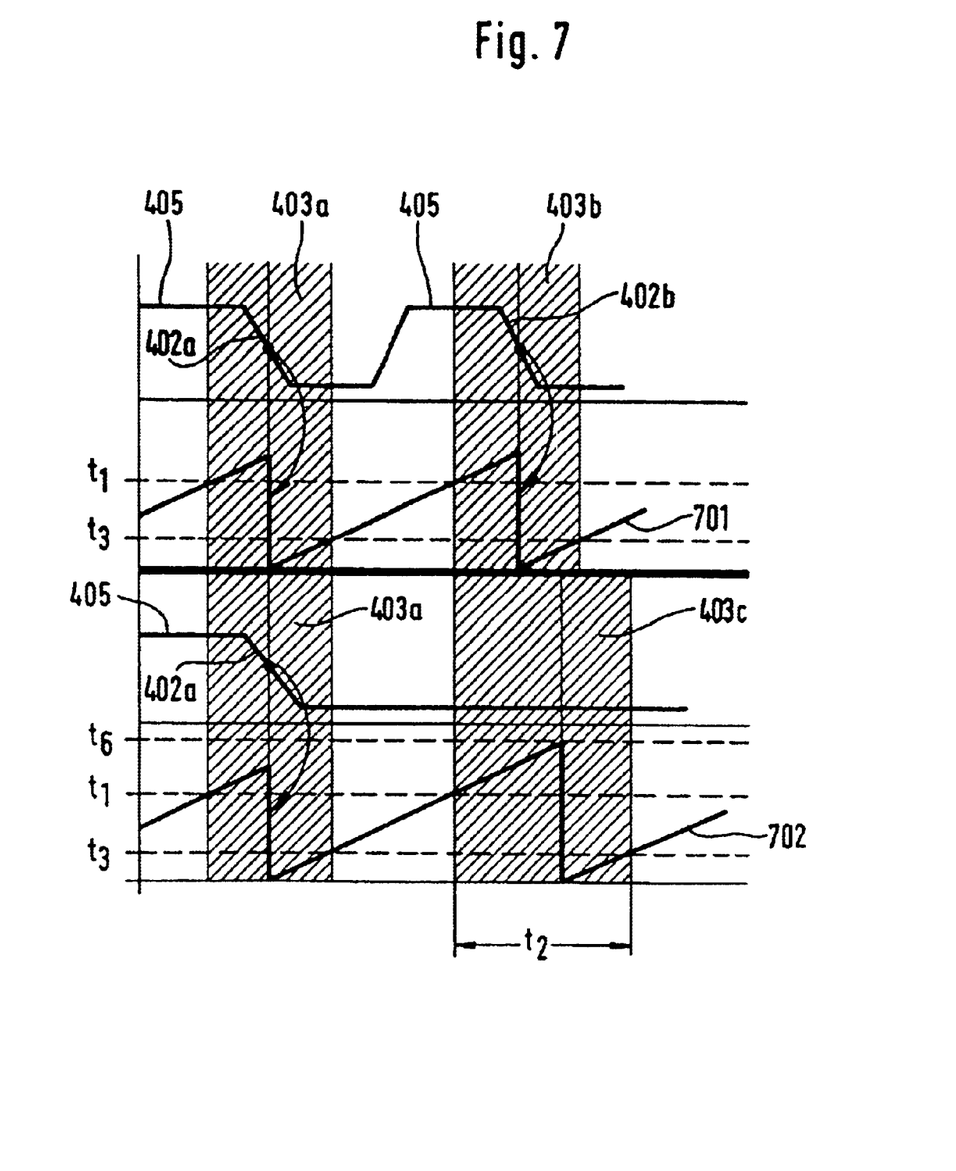
FIG. 7 shows two time diagrams for illustration of embodiments of the present invention.

FIG. 7 shows various signal variations, related counts 701, 702 of the second counter 609 and time windows 403 according to an embodiment of the present invention. Illustrated in the top part of FIG. 7 are two data edges 402a,b along with their encompassing time windows 403a,b below is the count 701 of the second counter 609. The second counter 609 is reset and started again when a data edge 402a is detected in a time window 403a. When it has subsequently reached a value that corresponds to the third duration $t_3$, the time window 403a in which the data edge 402a was detected will be closed. The second counter 609 continues counting. When it has reached a value that corresponds to the first duration $t_1$, a new time window 403b will be opened. The second counter 609 continues counting and will not be reset until a data edge 402b is detected in the new time window 403b.

In the event that an edge appears late or not at all in an opened time window 403c, the procedure will be as shown in the bottom part of FIG. 7. A signal variation with only one data edge 402a and two time windows 403a,c and the related count 702 of the second counter 609 is illustrated therein. The second counter 609 is reset and started again when the data edge 402a is detected in the first time window 403a The time window 403a is closed and a new time window 403c is opened depending on the respective count, as described hereinabove. The second counter 609 counts until it has reached the value that corresponds to the sixth duration $t_6$. Although no edge has been detected so far in the opened time window 403c, counter 609 will now be reset and restarted nevertheless. Then the time window 403c will be closed again as usual after the third duration $t_3$. If an edge still appears in the opened time window 403c after the reset of the second counter 609, the second counter 609 will be reset and restarted once more, and the time window 403c will be closed after another duration $t_3$. In other words, an edge must have been detected within a second duration $t_2$ after opening of a time window 403, otherwise the time window 403 will be closed again. The second duration $t_2$ can be determined as follows from the durations $t_1$, $t_3$, and $t_6$:

$$t_2 = t_6 - t_1 + t_3.$$

The durations $t_1$, $t_3$, and $t_6$ are preferably defined as follows:

$$t_1 = t_m/2 + Dt,$$

$$t_3 = t_m/4,$$

$$t_6 = t_m.$$

The positive fourth duration Dt is e.g. determined in dependence on the duration of the trailing edge of the wheel pulse 401 or auxiliary pulse 501 and/or the data edges 402 (leading or trailing) and/or the time constant $t_m$. In the optimal case, when $t_m$ is equal to the coding clock pulse, $Dt = t_m/4$ preferably applies.

Figure 8A:
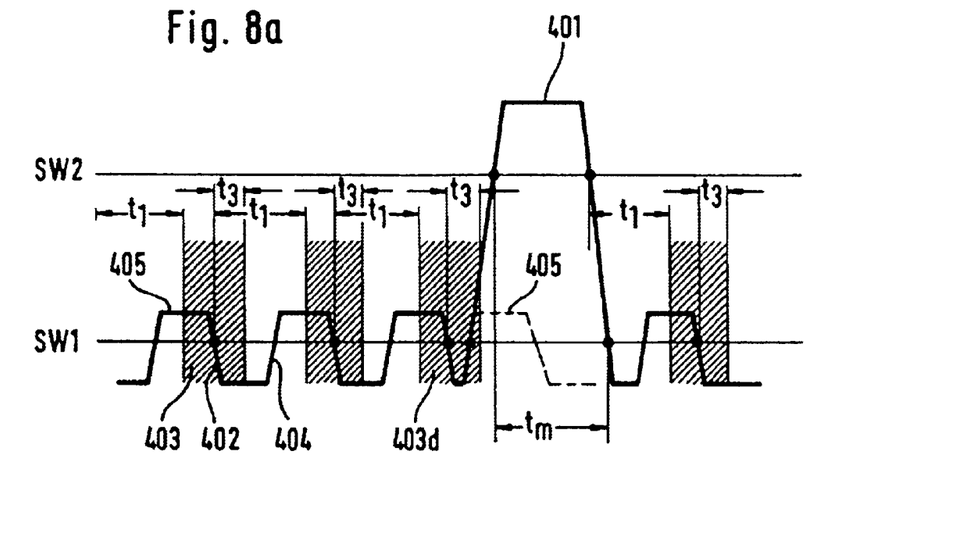
FIG. 8 is a view of two real signal variations according to the present invention with a schematic representation of another embodiment of the method of the present invention.
Figure 8B:
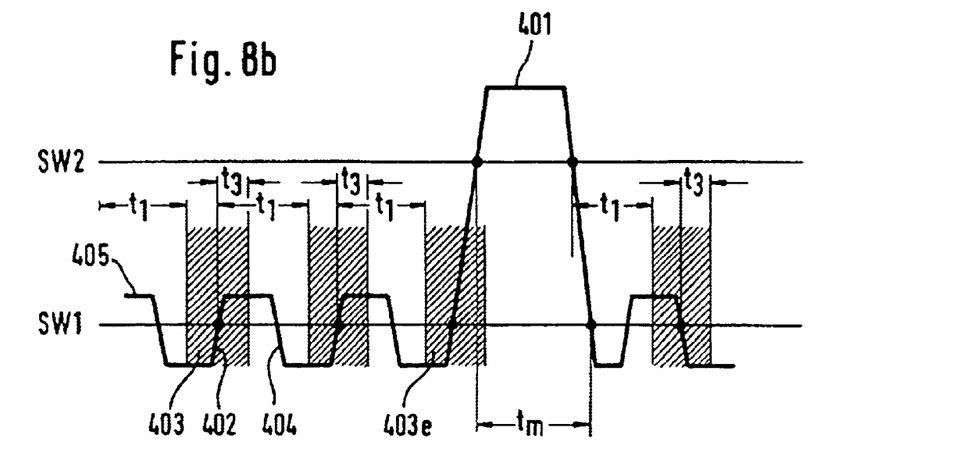

In the absence of detection of an edge in a time window 403c, the error detection unit 612 detects an error. Further potential errors which can be detected by the error detection unit 612 are illustrated in FIG. 8. The time window 403d,e is respectively reviewed in FIG. 8a and FIG. 8b. Two edges are detected in the mentioned time window 403d in the first case in FIG. 8a. The second edge may e.g. be the leading edge of a wheel pulse 401 or an intermediate edge 404 or data edge 402 of a data pulse 405. The error detection unit 612 e.g. detects an error when more than one edge is detected in a time window 403. It will then induce the validity setting unit 615 to set a validity bit which indicates a defective data bit. When the second edge detected is a leading edge of a wheel pulse 401, the said's width $t_m$ will be determined by the first determining unit 605, whereupon new data processing can take place.

The same applies to the case illustrated in FIG. 8b. In this case, only one edge is detected in the time window 403e, but this edge is the leading edge of a wheel pulse 401. This edge is detected because the wheel pulse 401 exceeds the threshold value SW2 during the opened time window 403. Therefore, the third duration $t_3$ is preferably longer than the time which a wheel pulse needs to exceed the second threshold value SW2 after the first threshold value SW1 is exceeded. The error detection unit 612 then detects an error, whereupon again a corresponding validity bit is set. When a parity bit (for example, as a last data bit) is sent in the data transfer as well, preferably not only the corresponding validity bit is set upon error detection of the parity bit, but all validity bits are set. The wheel pulse 401 is in turn measured by the first determining unit 605, and a new data conditioning operation for the subsequent cycle can commence.

When the error detection unit 612 detects an error, data conditioning is discontinued and all subsequent data bits are not conditioned until a wheel pulse 401 or auxiliary pulse 501 has appeared again. This is shown by the example of a non-appearing edge in a time window 403 in FIG. 5. No edge is detected therein in time window 403f and, thus, the further conditioning of data is terminated in that no further time window 403 is opened. The subsequent data pulses 405 are quasi ignored.

Preferably, each data bit itself represents a single information such as brake wear or brake temperature. For example, this is a yes/no or OK/not-OK information. Thus, a logical 1 can indicate an allowed brake temperature and a logical 0 can indicate an inadmissible brake temperature. Other information, e.g. analog signals, can be represented also by a combination of several data bits. The data bits preferably include one priority. The first data bit is the most important one which carries the most important information and should be transferred as frequently as possible, and the last data bit has the lowest priority because said indicates a less important information. Hence, it is acceptable that the rear bits are not conditioned in the event of a faulty transfer or at high wheel speeds. It is preferred that a parity bit is transmitted as the last bit. The definition of the parity bit, e.g. even or odd parity, must be agreed upon between transmitter and receiver. In a failfree transfer, data conditioning is terminated when the maximum number $A_B$ of data bits to be conditioned was conditioned, i.e., no time The circuit 52 further includes an analog multiplexer (MUX) 64 which allows the differential value corresponding to a selected one of the pixels to be passed through to a charge transimpedance amplifier (CTIA) 66 which can have a variable gain. The amplified differential signal is stored by another sample-and-hold circuit 68 and is provided to a summing node 70. The summing node 70 also receives signal from a calibration network 72 which uses reference voltages VREF2, VREF3. The output of the summing node 70 is provided to a analog-to-digital converter (ADC) 74 which uses a reference voltage (VREF1). One of more latches 76 store the digital bits and can be enabled to transmit the bits to the bus 54 window 403 will be opened until a new wheel pulse 401 or auxiliary pulse 501 has appeared.

The data memory 614 can be rated so that it can receive exactly the maximum number $A_B$ of data bits to be conditioned, that is, preferably 9 bits. However, it can also be larger in order to store still further information bits. The validity memory 616 is preferably so designed that it contains a corresponding validity bit for each data bit. However, it could also indicate only starting from which data bit the data bits are invalid, or it could have a different design. The validity setting unit 615 will set in this case at least one validity bit, preferably, however, one validity bit for each data bit to be conditioned.

Figure 9:
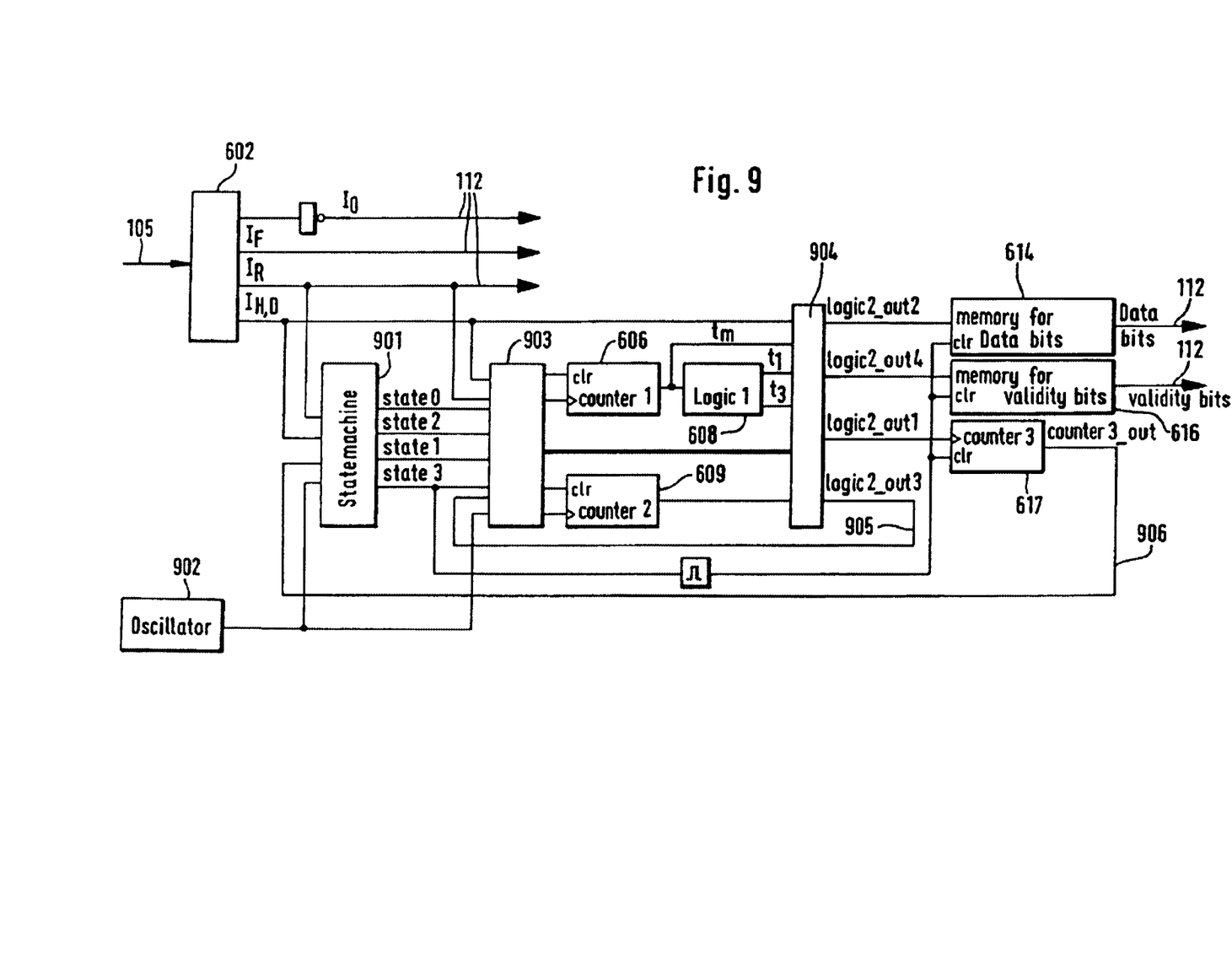
FIG. 9 is an embodiment of a circuit of the device of the present invention.

FIG. 9 shows a more specific embodiment of a device according to the present invention. Among others, the concept of a 'state machine' 901 is realized in it. Before the circuit of FIG. 9 is explained, the mode of operation of the state machine 901 will be explained with reference to FIG. 10.

Figure 10:
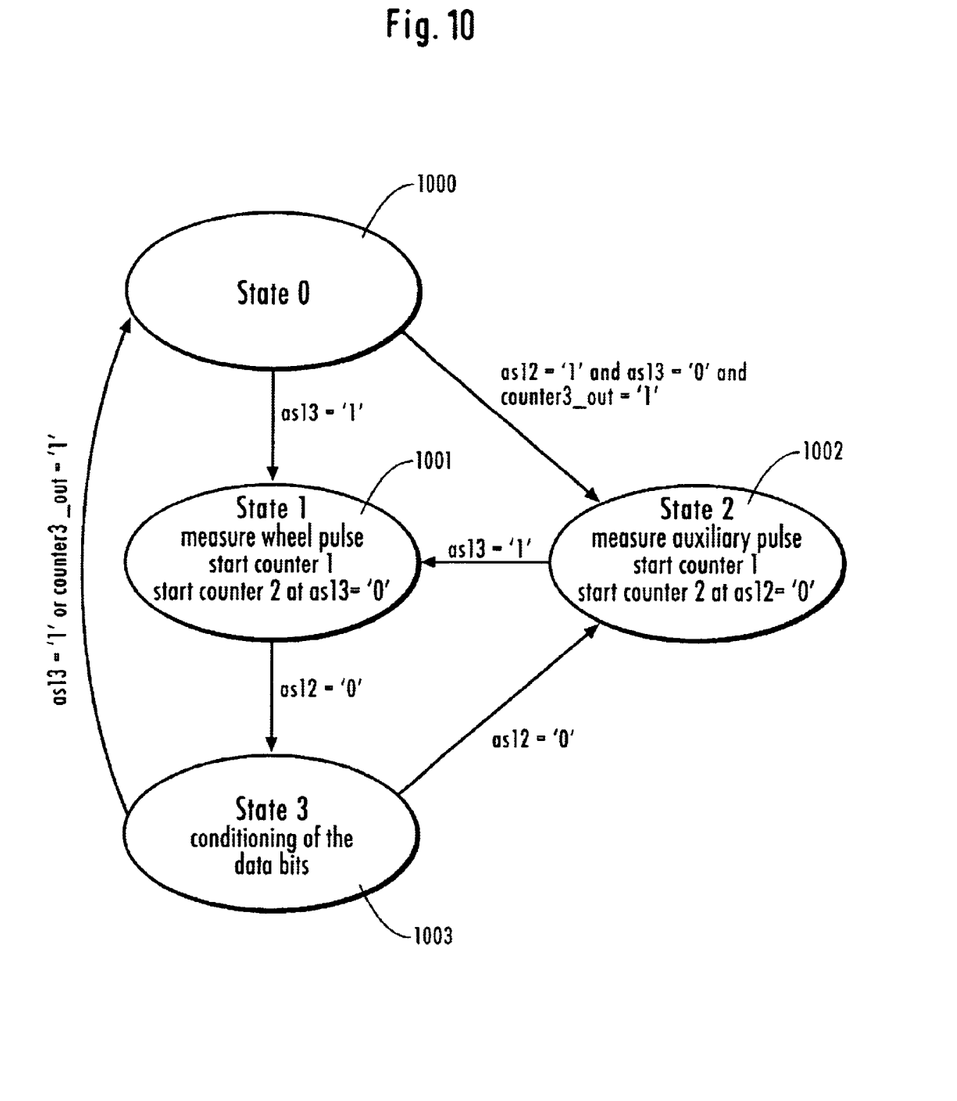
FIG. 10 is a graph of a 'state machine' to carry out the present invention.

Before the arrival of either a wheel pulse 401 or an auxiliary pulse 501, the circuit is in the inactive state 1000 (State 0). It neither receives data nor takes special actions. As soon as a leading edge is detected (because the amplitude exceeds the first threshold value SW1), the circuit changes over in state 1002 (State 2) in which measuring of an auxiliary pulse 501 is started. When the second threshold value SW2 also is exceeded in the further course, transition to state 1001 (State 1) is made in which the pulse width of the wheel pulse 401 is measured. Also, the case may occur that the pulse rise is so quick that the exceeding of the first threshold value SW1 cannot be perceived separately of the exceeding of the second threshold value SW2. Then, a direct transition from state State 0 1000 to the state State 1 1001 is made. When the value falls below the first threshold value SW1 again, transition to the state 1003 (State 3) is made in which conditioning of the received data edges 402 is started. When this operation is terminated, transition to the state State 0 1000 is made again. These state transitions consequently occur mainly in accordance with the threshold value decisions.

In FIG. 9, the signal pulses are sent to the circuit by way of line 105. The signal is compared in the threshold value comparison unit 602 e.g. with the threshold values SW0, SW1, SW2 and SW3, and the four amplitude ranges or signals $I_O$, $I_F$, $I_R$, and $I_{H,D}$ are indicated at the output of the threshold value comparison unit 602 according to FIG. 3. Thereafter, the error signals $I_O$ and $I_F$ can be submitted to an arrangement for deletion of errors (not shown). The wheel signal $I_R$ can be submitted to an arrangement for determining the wheel speed (not shown). 901 is the state machine which receives the relevant amplitude signals from the threshold value comparison unit 602 and causes activation of individual circuit components due to the variation of these signals. When a pulse passes from the amplitude range $I_G$ to the amplitude range $I_{H,D}$ in the state State 0 1000 which can be indicated, for example, by an alternation of the signal $I_{H,D}$ from a logical '0' to a logical '1', and the output signal 906 of the third counter 502 indicates e.g. a logical '1' because the third counter has reached the count $t_5$, the signal State 2 e.g. passes over to logical '1', whereupon the first counter 606 is started to measure the width of the auxiliary pulse 501. The first logic 903 controls the first counter 606 and the second counter 609 e.g. by clocked operation of the two counters 606, 609 with the clock of the oscillator, and by resetting and restarting them. When the input signal reaches the amplitude range $I_R$ as well, for example, also the signal IR shows a logical '1' which is sent to the state machine 901. Corresponding to the transition into the state State 1 1001, the signal State 1 will then show e.g. a logical '1'. Subsequently, the first logic 903 resets the first counter 606 and starts it again in order to measure the width of the wheel pulse 401. The first counter 606 stops counting when values have fallen below the pulse range $I_{H,D}$ again and, thus, e.g. the two signals $I_R$ and $I_{H,D}$ show a logical 0.

After measuring of an auxiliary pulse (in the state State 2) or a wheel pulse (in the state State 1) there is a transition into the state State 3 1003 and, thus, the third counter 502 is started. Conditioning of the data can now take place. The second counter 609 will be reset and restarted for the opening of the first time window 403 after detection of a wheel pulse 401 or auxiliary pulse 501 when e.g. the wheel pulse 401 drops below the second threshold value SW2 or the auxiliary pulse 501 drops below the first threshold value SW1 because it is preferred to terminate the measurement of the pulse width $t_m$ at that moment. Subsequently, the second counter 609 is reset and restarted again when the second counter 609 has counted to $t_6$, and $t_6=t_m$ in this embodiment, or when the second counter has counted at least to $t_1$ and an alternation of the signal $I_{H,D}$ from logical 0 to logical 1, or vice-versa, i.e., an edge in an opened time window 403, is detected in the second logic 904. The first logic 903 is informed by the output signal 905 of the second logic 904 at what time it shall reset the second counter 609.

The values $t_1$ and $t_3$ for opening and closing a time window 403 are determined in the second determining unit 608 (to which the first counter 606 forwards a value which corresponds to the time constant $t_m$ and, for reasons of simplicity, is also referred to by tm) and relayed to the second logic 904. The second logic 904 receives from the first counter 606 also the value $t_m$ and compares the count of the second counter 609 with the values $t_6=t_m$, $t_1$, and $t_3$. The sixth duration $t_6$ equals the time constant $t_m$ and, therefore, need not be determined by the second determining unit 608. However, the sixth duration can also be determined as another value like in FIG. 6.

The detected edge is stored as a data bit in the data memory 614, depending on the coding, and a corresponding validity bit is stored in the validity memory 616. This latter operation can e.g. be carried out after closing of a corresponding time window 403 in order that error detection can be performed while the window 403 is opened and the corresponding validity bit can be set thereafter. The data bits and validity bits can be read out by way of line 112.

The conditioning operation is carried out until e.g. the third counter 502 has counted until the duration $t_5$ or a new wheel pulse 401 is detected. Transition into the state State 0 1000 is made in the first case and into the state State 2 1002 in the second case.

When the data are amplitude-coded as in FIG. 2, for example, it is possible that the signal is sampled at defined points of time, and these times can be chosen in dependence on on signal edges. The signal edges may e.g. be data edges, and the his case after the time $t_m/2$ after a data edge.

What is claimed is:

1. Method of conditioning a received signal that contains amplitude-coded data, wherein the coding of the individual data includes a defined coding clock pulse, and wherein the received signal includes edges produced in accordance with the coding clock pulse, and wherein the received signal includes the signal of an active sensor of a vehicle wheel, comprising the following steps:

determining, from the received signal, a time constant ($t_m$) set in accordance with the coding clock pulse, wherein said time constant is determined in accordance with the duration of a first pulse, and conditioning portions of said received signal according to the first pulse, at fixed times in accordance with the time constant ($t_m$), determining a first and a second time in accordance with the time constant ($t_m$), wherein the second time is set in dependence on the time of an edge determined at the first time, conditioning a first signal part which has a first edge at the first time, conditioning a second signal part at the second time, and detecting another edge in the received signal at a third time set in accordance with the time constant ($t_m$), wherein the third time is set based on an edge which has been detected as a last edge.

2. Method of conditioning a received signal that contains encoded data, wherein the coding of the data includes a defined coding clock pulse, wherein the signal includes edges produced in accordance with the coding clock pulse, and the transmitted signal includes distinguishable pulses of an active sensor of a vehicle wheel, comprising the steps of:

determining from the received signal a time constant ($t_m$) set in accordance with the coding clock pulse, said time constant being determined in accordance with the duration of a first pulse of said received signal, and conditioning parts of said received signal which include edges occurring after the first pulse, evaluating amplitude-coded data contained within said received signal by establishing a series of time windows which are set in accordance with the time constant ($t_m$), determining a first and a second time window within said series of time, wherein the second time window is set in dependence on the time of the edge determined at the first time, conditioning a first signal part that has a first edge in the first time window, conditioning a second signal part in the second time window, and detecting another edge in the received signal in a third time window set in accordance with the time constant ($t_m$), wherein the third time window is set based on an edge which has been detected as a last edge.

3. Method as claimed in claim 2, wherein the first and second time window is opened based on a last detected edge according to a first duration ($t_1$) that is set in accordance with the time constant ($t_m$).

4. Method as claimed in claim 2, wherein at least one of said first and second window is closed again in accordance with the time constant ($t_m$) in dependence on the time of an edge that is detected within the at least one of said first and second window.

5. Method as claimed in claim 4, further including the step of:

closing at least one of said first and second time windows after a third duration ($t_3$) when another edge is detected after opening of at least one of said first and second time windows within a second duration ($t_2$) that is set in accordance with the time constant ($t_m$).

6. Method as claimed in claim 5, wherein said first ($t_1$), second ($t_2$), and third ($t_3$) durations are set corresponding to the following equations:

$$t_1 = t_m/2 + Dt,$$

$$t_2 = 3*t_m/4 - Dt,$$

$$t_3 = t_m/4,$$

wherein:

$t_m$ is the time constant which is equal to the coding clock pulse, $t_1$ is the first duration, $t_2$ is the second duration, $t_3$ is the third duration, and Dt is a fourth duration which is determined in accordance with the steepness of an edge and the time constant ($t_m$).

7. Method as claimed in claim 6, wherein the received signal is sent by an active sensor of a vehicle wheel.

8. Method as claimed in claim 7, wherein the first signal pulse is a wheel pulse which is used to determine the wheel rotational speed, and further signal pulses are data pulses having edges that facilitate the coded transfer of data, and wherein the wheel pulse is replaced by an auxiliary pulse at a transmitting end in the event of a non-rotating wheel.

9. Method as claimed in claim 8, further including the step of:

detecting an error whenever no edge, more than one edge, or a wheel pulse is detected in one time window within said series of time windows.

10. Method as claimed in claim 9, wherein the auxiliary pulse has an amplitude which is higher than a first threshold value and lower than a second threshold value, and the wheel pulse has an amplitude which is higher than the second threshold value, and an error is detected when a third threshold value is exceeded which is higher than the second threshold value.

11. Method as claimed in claim 10, further including the step of:

determining the duration of the wheel pulse by measuring the time duration between the time the wheel pulse value exceeds the second threshold value and the time the wheel pulse value falls below the first threshold value.

12. Method as claimed in claim 11, further including the step of:

when no further wheel pulse is detected within a fifth duration ($t_5$) that is set in accordance with the time constant ($t_m$) after a wheel pulse or auxiliary pulse has fallen below the first threshold value or the second threshold value, another pulse which exceeds the first threshold value but not the second threshold value is detected as auxiliary pulse.

13. Method as claimed in claim 12, wherein the fifth duration ($t_5$) is longer than the duration which is required for the transfer of predetermined maximum number of data bits to be conditioned.

14. Method as claimed in claim 11, wherein the first time window containing a first data bit is opened after the first duration ($t_1$) when a wheel pulse falls below the second threshold value or an auxiliary pulse falls below the first threshold value.

15. Method as claimed in claim 14, wherein the conditioning of the received signal after detection of an error is interrupted until a new wheel pulse or auxiliary pulse is detected.

16. Method as claimed in claim 11, wherein the third duration ($t_3$) is longer than the duration which the wheel pulse requires to exceed the second threshold value after exceeding of the first threshold value.

17. Method as claimed in claim 2, wherein the time constant ($t_m$) is determined and the received signal is conditioned in real time.

18. Method as claimed in claim 2, wherein the received signal is sampled at a rate set in accordance with the time constant ($t_m$).

19. A device for conditioning a received signal that contains encoded data, said signal originating from an active sensor of a vehicle wheel, wherein the coding of the individual data includes a defined coding clock pulse, the signal includes edges produced in accordance with the coding clock pulse and the signal includes distinguishable pulses, including an edge detection unit for detecting an edge in a time window and a time window setting unit, comprising:

a first determining unit for determining from the received signal a time constant ($t_m$) set in accordance with the coding clock pulse, wherein the first determining unit determines the time constant ($t_m$) in accordance with the duration of the first pulse, and the time window setting unit for setting a first time window in accordance with the time constant ($t_m$) and for setting a second time window in accordance with the time constant ($t_m$) and in dependence on the time of an edge detected in the first time window by the edge detection unit.

20. Device as claimed in claim 19, wherein said first determining unit is effective for conducting its determining function from binary data.

21. Device as claimed in claim 19, further including a vehicle brake control system, coupled to said first determining unit and said time window setting unit.

22. Device as claimed in claim 21, further including:

a pulse detection unit which includes a threshold value comparison unit that compares the amplitudes of the pulses with a first, a second, and a third threshold value, and the pulse detection unit detects an auxiliary pulse or data pulse when a pulse exceeds the first and not the second threshold value, detects a wheel pulse when a pulse exceeds the second and not the third threshold value, and detects an error when a pulse exceeds the third threshold value.

23. Device as claimed in claim 22, wherein the first determining unit includes a first counter for defining the duration of the wheel pulse or auxiliary pulse which is started when the wheel pulse or auxiliary pulse exceeds the first threshold value, and is possibly reset and restarted when the wheel pulse exceeds the second threshold value and is stopped when the wheel pulse or auxiliary pulse falls below the first threshold value.

24. Device as claimed in claim 19, wherein the time window setting unit includes the following:

a second determining unit for determining a first ($t_1$), third ($t_3$), and sixth duration ($t_6$) in accordance with the time constant ($t_m$), a first duration comparison unit which receives the first ($t_1$), third ($t_3$), and sixth duration ($t_6$) from the second determining unit, and a second counter whose output is connected to the first duration comparison unit and whose count determines closing and opening of the time window, wherein the second counter is reset and restarted when the edge detection unit has detected an edge in a time window, the time window setting unit closes a time window when the second counter has reached a first count which corresponds to the third duration ($t_3$), the time window setting unit opens a time window when the second counter has reached a second count which corresponds to the first duration ($t_1$) and is greater than the first count, and the second counter is reset and restarted when the second counter has reached a third count which corresponds to the sixth duration ($t_6$) and is greater than the second count.

25. Device as claimed in claim 22, wherein the pulse detection unit further includes the following:

a third counter for measuring the time that lapsed since the commencement of conditioning of a signal, which counter is reset and restarted in particular when a wheel pulse or auxiliary pulse has fallen below the first threshold value, a third determining unit for determining a fifth duration ($t_5$) in accordance with the time constant ($t_m$), and a second duration comparison unit which compares the count of the third counter with a value that corresponds to the fifth duration ($t_5$), wherein when the third counter has reached the value that corresponds to the fifth duration ($t_5$), the pulse detection unit detects another pulse which exceeds the first but not the second threshold value as auxiliary pulse.

26. Device as claimed in claim 22, further including an error detection unit for detecting an error when the edge detection unit detected no edge, a plurality of edges, or the pulse detection unit detected a wheel pulse in a time window.

27. Device as claimed in claim 19, wherein a memory unit for storing the conditioned data and at least one validity bit.

28. Device as claimed in claim 27, wherein the memory unit includes a validity setting unit, a data memory in which the data bits are stored, and a validity memory in which the validity bits are stored, wherein the validity setting unit sets a validity bit with a first value when the error detection unit detected no error in a time window, and sets a validity bit with a second value when the error detection unit detected an error in a time window and wherein, when errors appear when reading the parity bit, all validity bits are set with the second value.

* * * * *